(12) United States Patent
Labordus et al.

(10) Patent No.: US 12,064,925 B2
(45) Date of Patent: Aug. 20, 2024

(54) FIBER-REINFORCED COMPOSITE LAMINATE FOR USE IN ELECTROMAGNETIC WELDING AND METHOD OF ELECTROMAGNETIC WELDING OF MOLDED PARTS OF SAID LAMINATES

(71) Applicant: KOK & VAN ENGELEN COMPOSITE STRUCTURES B.V., The Hague (NL)

(72) Inventors: Maarten Labordus, The Hague (NL); Tom Jansen, The Hague (NL); Michiel Hendrik Paul Bruijkers, The Hague (NL); Thomas Wirtz, The Hague (NL); Alexandros Michaïl Mitrousias, The Hague (NL); Sacha Schmitter, The Hague (NL)

(73) Assignee: KOK & VAN ENGELEN COMPOSITE STRUCTURES B.V., The Hague (NL)

( * ) Notice: Subject to any disclaimer, the term of this patent is extended or adjusted under 35 U.S.C. 154(b) by 0 days.

(21) Appl. No.: 17/920,976

(22) PCT Filed: Apr. 30, 2021

(86) PCT No.: PCT/NL2021/050286
§ 371 (c)(1),
(2) Date: Oct. 24, 2022

(87) PCT Pub. No.: WO2021/221510
PCT Pub. Date: Nov. 4, 2021

(65) Prior Publication Data
US 2023/0166458 A1 Jun. 1, 2023

(30) Foreign Application Priority Data

Apr. 30, 2020 (NL) .................................... 2025473

(51) Int. Cl.
*B32B 5/26* (2006.01)
*B29C 65/00* (2006.01)
(Continued)

(52) U.S. Cl.
CPC .......... *B29C 65/38* (2013.01); *B29C 66/7212* (2013.01); *B32B 5/028* (2013.01); *B32B 5/26* (2013.01); *B32B 2262/106* (2013.01)

(58) Field of Classification Search
CPC ...................................................... B32B 5/26
See application file for complete search history.

(56) References Cited

U.S. PATENT DOCUMENTS

| 5,313,034 A | 5/1994 | Grimm et al. |
| 6,023,054 A * | 2/2000 | Johnson, Jr. ........ B29C 65/4815 442/132 |

(Continued)

FOREIGN PATENT DOCUMENTS

| WO | 03026821 A1 | 4/2003 |
| WO | 2011069899 A2 | 6/2011 |
| WO | 2019231327 A1 | 12/2019 |

OTHER PUBLICATIONS

International Preliminary Report on Patentability, dated Mar. 16, 2022, for Application No. PCT/NL2021/050286 (15 pages).

(Continued)

*Primary Examiner* — Andrew T Piziali
(74) *Attorney, Agent, or Firm* — KDW Firm PLLC (57) ABSTRACT

A fiber-reinforced composite laminate for use in electromagnetic welding of molded parts of said laminates. The laminate has a plurality of structural layers, each formed of electrically conductive fibers embedded in a thermoplastic matrix. Eddy currents may be induced in the electrically conductive fibers by an electrical conductor that generates an electromagnetic field. The structural layers include a first, (Continued)

a second and, optionally, a third pair of two adjacently positioned structural layers. The first pair has an intermediate layer which allows eddy currents to flow between the two structural layers of the first pair. The second pair has an intermediate layer which prevents eddy currents from flowing between the two structural layers of the second pair. The optional third pair does not have an intermediate layer. The laminate shows efficient heating by an electromagnetic field.

16 Claims, 6 Drawing Sheets

(51) Int. Cl.
    *B29C 65/38*     (2006.01)
    *B32B 5/02*     (2006.01)

(56) References Cited

U.S. PATENT DOCUMENTS

| | | | |
|---|---|---|---|
| 6,323,468 | B1 | 11/2001 | Dabelstein et al. |
| 9,873,242 | B2* | 1/2018 | Bae ................ B29C 70/506 |
| 2002/0038801 | A1 | 4/2002 | Laken et al. |
| 2010/0059719 | A1* | 3/2010 | Ohno ................ C08J 5/04 |
| | | | 252/511 |
| 2020/0001569 | A1 | 1/2020 | Calder et al. |
| 2020/0055259 | A1* | 2/2020 | Tiryaki ............ B29C 66/1122 |
| 2021/0001567 | A1* | 1/2021 | Ogale ............ B29C 66/72141 |
| 2022/0266537 | A1* | 8/2022 | Glotin ............ B29C 66/863 |

OTHER PUBLICATIONS

International Search Report and Written Opinion, dated Aug. 5, 2021, for Application No. PCT/NL2021/050286 (13 pages).

* cited by examiner

FIBER-REINFORCED COMPOSITE LAMINATE FOR USE IN ELECTROMAGNETIC WELDING AND METHOD OF ELECTROMAGNETIC WELDING OF MOLDED PARTS OF SAID LAMINATES

This application is a national stage filing under 35 U.S.C. 371 of pending International Application No. PCT/NL2021/050286, filed Apr. 30, 2021, which claims priority to Netherlands Patent Application No. 2025473, filed Apr. 30, 2020, the entirety of which applications are incorporated by reference herein.

FIELD OF THE INVENTION

The present invention relates to the field of composite materials. In particular, the present invention relates to structures formed by electromagnetic welding of multiple molded parts made of composite materials. The present invention finds particular application to the field of aerostructures formed by electromagnetic welding of multiple composite molded parts.

BACKGROUND

Composite laminates and molded parts made form such laminates are used in an increasing number of applications in which advantage is taken of the relatively high specific stiffness and strength of composite materials. Reduction of weight is particularly important in the aerospace industry. A commonly used material in this industry is a composite laminate of carbon fibers and a thermosetting matrix polymer. Complex molded parts made of such laminates can be made but once the thermosetting matrix polymer in such parts cures, the shape is permanent. To obtain complex structures, the molded parts frequently have to be connected to each other or to other parts, such as stiffeners. This traditionally happens by mechanical means, such as by bolting, or chemically, such as by adhesive bonding.

More recently, composite laminates of carbon fibers and a thermoplastic matrix polymer have been introduced. Such thermoplastic composite laminates may be shaped after consolidation, simply by heating the thermoplastic polymer matrix above its softening or melting temperature.

Since the carbon fibers are electrically conductive, eddy currents may be induced in the carbon fibers by an electrical conductor that generates an electromagnetic field. The eddy currents heat the carbon fibers and produce a heating of molded parts from within. This property offers the possibility of electromagnetic welding of molded parts of said laminates. The thermoplastic polymer matrix in such a process is heated by eddy currents to above its softening or melting temperature, which allows an electromagnetically weldable outside surface of each of the molded parts to fuse or weld together. Heating of portions of a molded part other than its weldable surface is generally undesirable since this may cause damage to the molded part portions.

SUMMARY OF THE INVENTION

It is an object of the invention to provide an improved method of electromagnetically connecting molded parts of fiber-reinforced composite laminates. It is a further object to provide a fiber-reinforced composite laminate for use in such improved method of electromagnetic welding of molded parts. Yet another object relates to a method for manufacturing such a fiber-reinforced composite laminate.

The invention provides for these and other purposes a fiber-reinforced composite laminate for use in electromagnetic welding of molded parts of said laminates in accordance with claim 1. The fiber-reinforced composite laminate comprises a plurality of structural layers, each formed of electrically conductive fibers embedded in a thermoplastic matrix, wherein eddy currents may be induced in the electrically conductive fibers by an electrical conductor that generates an electromagnetic field;

wherein the plurality of structural layers comprises a first, a second and, optionally, a third pair of two adjacently positioned structural layers, wherein the first pair has an intermediate layer positioned in between the two structural layers of the pair, wherein the intermediate layer has an out-of-plane electrical volume resistance $R_1$, which substantially allows eddy currents to flow between the two structural layers of the first pair;

the second pair has an intermediate layer positioned in between the two structural layers of the pair, wherein the intermediate layer has an out-of-plane electrical volume resistance $R_2$, which substantially prevents eddy currents from flowing between the two structural layers of the second pair; and the third pair does not have an intermediate layer in between the two structural layers of the pair;

wherein moreover $R_1$ and $R_2$ are finite and $0<R_1<R_2$. The intermediate layer in each pair differs from the two structural layers in each pair, preferably in that the intermediate layer in each pair does not comprise electrically conductive fibers. Accordingly, each intermediate layer does not fulfil a structural or load bearing function, or to a minor extent only.

According to the invention, when an electrical conductor that generates an electromagnetic field is provided in the vicinity of the invented laminate, eddy currents are induced in the electrically conductive fibers which cause them to heat up by Joule heating, which also heats up the surrounding thermoplastic matrix polymer.

Joule heating, also known as resistive, resistance, or Ohmic heating, is a process by which the passage of an electric current through a conductor produces heat. The amount of heat is proportional to the resistance experienced in the direction in which the current flows.

A second pair of adjacently positioned structural layers will hardly be subject to Joule heating since eddy currents are substantially prevented from flowing between the two structural layers of the second pair. This is made possible by providing an intermediate layer in such a second pair having an out-of-plane electrical volume resistance $R_2$ that is relatively high compared to $R_1$. In a second pair, Joule heating is substantially confined to the eddy currents induced in the electrically conductive fibers of each layer separately, which causes less heat generation. This prevents portions of a laminate that contain one or more second pairs from heating too much under the influence of an electromagnetic field. Such second pair portions may therefore be prevented from overheating, which may otherwise be damaging.

For welding, an electromagnetic field has to heat up other portions of the laminate in order to be able to bring the thermoplastic matrix polymer in said portions to a temperature exceeding a softening or melting temperature of the matrix polymer. To this end, a third pair of adjacently positioned structural layers may be used. A third pair of adjacently positioned structural layers will heat up by so-called junction heating caused by direct fiber-fiber contact and/or dielectric hysteresis. Eddy currents are substantially allowed to flow between the two structural layers of the third pair, which layers indeed are connected directly to each other without the intervention of an intermediate layer with a relatively elevated finite out-of-plane electrical volume resistance $R_2$. Joule losses in third pairs are modest since the current in an out-of-plane direction flows against an electrical surface resistivity $\rho_3$ (in Ohm.m²) which is relatively low. Measured electrical surface resistivity $\rho_3$ values are typically less than $10^{-3}$ Ohm.m², for instance between $0,20.10^{-4}$ and $5.10^{-4}$ Ohm.m².

The inventors have realized that Joule heating in the laminate may be increased for an equal electromagnetic field strength. Thereto, according to an aspect of the invention, a first pair has an intermediate layer positioned in between the two structural layers of the pair, wherein the intermediate layer has an out-of-plane electrical volume resistance $R_1$, which substantially allows eddy currents to flow between the two structural layers of the first pair. The out-of-plane electrical volume resistance $R_1$ is selected to be large enough to cause the Joule heating to be higher in a first pair than in a laminate only comprising second and third pairs of structural layers. The electrical volume resistance $R_1$ on the other hand is smaller than $R_2$ to allow eddy currents to flow between structural layers of the first pair. The first pairs in other words allow optimizing the laminate in terms of efficiency of heating up. Second pairs of the laminate stay relatively cool to prevent damage, while first pairs heat up more efficiently than known in the art, which prior art indeed relies on using third pairs only, i.e. laminates having a plurality of structural layers that are connected directly to each other.

Without being bound by any theory, it may well be that the out-of-plane electrical volume resistance $R_1$ of the intermediate layer of a first pair is optimized to increase Joule heating and yet substantially allows eddy currents to flow between the two structural layers of the first pair. Such an optimization may be performed by selecting factors that influence the out-of-plane electrical volume resistance $R_1$. This resistance is given by the following formula:

$$R_1 = \rho \rho_1 \cdot t / A \quad (1)$$

Herein, $\rho_1$ is the electrical volumetric resistivity of the material of the intermediate layer in Ohm.m, 't' is the average thickness of the intermediate layer, whereas 'A' is the area through which the electrical current flows. The area 'A' in a laminate is about equal to the surface area of the laminate. From this it follows that the out-of-plane electrical volume resistance $R_1$ may be influenced by selecting the (electrical resistivity of the) material of the intermediate layer, and/or the average thickness 't' of the intermediate layer. The upper bound $R_2$ may be determined by providing a laminate with second pairs and observing the heat generated in such a laminate by an electromagnetic field.

It should be noted that all values of the electrical (volume and surface) resistivity and resistance are measured at room temperature, being a temperature of 25° C.

Please note that the surface resistance $R_3$ in a third pair of structural layers between layers equals $\rho_3/A$, and that the total resistance between two layers in a first pair equals the volume resistance $R_1 + 2$ times the surface resistances $R_3$. Indeed, two interfaces exist between each structural layer and an intermediate layer. Since $R_1$ is generally substantially larger than $R_3$, the contribution of $R_3$ may be neglected.

An improved embodiment of the invention provides a laminate wherein $0,1\ R_2 < R_1 < 0,9\ R_2$, more preferably $0,2\ R_2 < R_1 < 0,8\ R_2$, even more preferably $0,3\ R_2 < R_1 < 0,7\ R_2$, and most preferably $0,4\ R_2 < R_1 < 0,6\ R_2$.

Another embodiment of the laminate according to the invention has an electromagnetically weldable outside surface and the first pair is located in the laminate at the weldable outside of the laminate in the out-of-plane direction of the laminate. This will promote heating of the weldable outside surface.

Yet another embodiment of the laminate according to the invention has an electromagnetically weldable outside surface and one of the second or third pair is located in the laminate at an outside opposite the weldable outside or inside the laminate. This will prevent overheating of the outside opposite the weldable outside or of the inside of the laminate. This embodiment also reduces the necessity of using a heat sink to reduce heating of portions of the laminate other than the weldable outside surface.

It has advantages to provide a laminate according to an embodiment wherein at least the intermediate layer in the second pair comprises non-conductive fibers, such as in the form of a thickness calibration gauze or mesh. Yet another preferred embodiment provides a laminate wherein at least the intermediate layer in the first pair comprises non-conductive fibers, such as in the form of a thickness calibration gauze or mesh. The above-mentioned embodiments allow a better control over the volumetric resistances $R_1$ and/or $R_2$. Indeed, when these laminates are molded into a molded product, the average thickness of the intermediate layer of the first and/or second pair will be less subject to change. Indeed, the non-conductive fibers are not easily compressed and may provide some protection against squeezing out of softened polymer. This is particularly relevant for the intermediate layer of a first pair, which indeed is heated up to a higher temperature than the intermediate layer of a second pair, given that $R_1 < R_2$.

Non-conductive fibers in the context of the present application are less apt to conduct electricity than carbon or graphite fibers for instance. Suitable examples are glass fibers, natural fibers such as jute, and organic fibers, such as polyethylene and polyaramide fibers.

It has further been established that heating under the action of an electromagnetic field may be promoted further by providing a laminate according to an embodiment wherein the electrically conductive fibers in at least one of the structural layers of the first, second and/or third pair are locally interrupted in at least one of the adjacent structural layers. The heating is seen to increase substantially at the local interruption.

Another useful embodiment provides a laminate wherein the electrically conductive fibers in two of the structural layers of the first, second and/or third pair are locally interrupted along a line in one structural layer of the pair, and along another line in the other adjacent layer of the pair, whereby both lines cross each-other.

Yet another useful embodiment provides a laminate wherein the electrically conductive fibers in two of the structural layers of the first, second and/or third pair are locally interrupted along a line in one structural layer of the pair, and along another line in the other adjacent layer of the pair, whereby both lines coincide with each-other.

A particularly useful embodiment provides a laminate wherein the electrically conductive fibers in the first and/or third pair are locally interrupted, since efficient heating is in particular desirable in these pairs.

The conductive fibers may be present in the structural layers in any form known in the art. For instance, the conductive fibers may be applied in the form of a woven fabric in which fibers run straight in a main fiber direction an undulated transverse fibers run in a direction about perpendicular to the main fiber direction. Also, the conductive fibers may be applied in the form of a random mat in which fibers run randomly in the plane of the mat. Other forms may comprise 3-dimensional structures, such as braided structures for instance. Yet another form may comprise a plurality of unidirectionally oriented fibers that run parallel to each other in a fiber direction. A preferred embodiment provides a laminate wherein the conductive fibers in the structural layers are unidirectionally oriented. The same holds for the optional non-conductive fibers that may be present in the intermediate layer of a pair.

When unidirectional fibers are used, a laminate according to a preferred embodiment is characterized in that at least the first pair comprises structural layers in which the unidirectional fiber direction differs from one structural layer to another. Particularly preferred is a first pair in which the unidirectional fiber direction in one structural layer runs about perpendicular to the unidirectional fiber direction in the other structural layer of the pair.

The structural layers are each formed of electrically conductive fibers embedded in a thermoplastic matrix. Particularly suitable materials for building the laminate comprise structural layers in the form of semi-finished products, also referred to in the art as prepregs. Thermoplastic polymers may be coupled between layers, or to the reinforcing fibers of a layer, in a simple manner by fusion when heated above a softening or melting temperature of the polymer. The prepregs may be stacked to form the laminate.

The material of the intermediate layers may be any material suitable for the purpose. For example, suitable materials used in the intermediate layers may be a rubber, a thermosetting and/or a thermoplastic polymer, or combinations of those. It has advantages when the material of the intermediate layer in a pair of structural layers is the same as, or similar to the thermoplastic matrix polymer used in the structural layers of the pair.

Examples of particularly suitable thermoplastic polymers comprise a polyolefin, such as polyethylene or polypropylene, a polyamide, and/or high temperature resistant polymers such as polyether imide, polyether ether ketone and polyphenylene sulphide, to name but a few.

The intermediate layers of the first and/or second pair of structural layers may be a separate layer that is inserted between two structural layers to form the pair. However, a preferred embodiment relates to a laminate wherein the structural layers have a thickness, such as in a prepreg, and a matrix polymer-rich area extends over part of the thickness at one or both sides of one or both layers. The intermediate layer of the first and/or second pair may then be formed by the polymer-rich area of at least one of the adjacent structural layers of the pair, and insertion of a separate intermediate layer between the structural layers is not necessary.

Several possibilities exist, depending on how such structural layers, preferably prepregs, are combined. First, matrix polymer-rich areas may be present at both sides of a structural layer, may be present at a top side, or may be present at a bottom side of the structural layer. A structural layer having a matrix polymer-rich area at one side only, may be combined with another structural layer having a matrix polymer-rich area at one side only in three ways, namely by providing the matrix polymer-rich areas against each other, by providing the matrix polymer-rich area of one structural layer against a matrix polymer non-rich area of the second structural layer, or by providing both matrix polymer non-rich areas against one another. Due to the different intermediate layer thicknesses achieved, a second pair, a first pair and a third pair may be achieved accordingly.

Indeed, an embodiment relates to a laminate wherein the intermediate layer of the first and/or second pair is formed by the polymer-rich area of at least one of the adjacent structural layers of the pair. Another embodiment relates to a laminate wherein the intermediate layer of the second pair is formed by the matrix polymer-rich area of both adjacent structural layers of the pair.

The intermediate layer of a first pair according to the invention has an out-of-plane electrical volume resistance $R_1$, whereas the intermediate layer of a second pair according to the invention has an out-of-plane electrical volume resistance $R_2$, wherein $R_1$ is selected such that eddy currents are substantially allowed to flow between the two structural layers of the first pair, and wherein $R_2$ is selected such that eddy currents are substantially prevented from flowing between the two structural layers of the second pair.

One way of influencing the out-of-plane electrical volume resistance R of an intermediate layer is to change its thickness. In an embodiment therefore, the laminate is characterized in that the average thickness $t_1$ of the intermediate layer of the first pair is lower than the average thickness $t_2$ of the intermediate layer of the second pair. The third pair exhibits an average thickness=0 since such a third pair does not have an intermediate layer in between its structural layers.

According to one embodiment, a laminate is provided wherein the intermediate layer of the first pair comprises a thermoplastic polymer and has an average thickness of between 0.05 and 0.15 mm, more preferably of between 0.07 and 0.12 mm.

Yet another embodiment provides a laminate wherein the intermediate layer of the second pair comprises a thermoplastic polymer and has an average thickness of larger than 0.20 mm.

It should be noted that the indicated average thicknesses are those after processing, i.e. after the laminate has been formed, optionally pressed, and consolidated.

The intermediate layers may be continuous over a complete planar area of the laminate, but they may also cover part of this planar area. The same holds for an area of contact between two adjacent structural layers. Indeed, according to an embodiment of the invention, a laminate is provided wherein the adjacent structural layers of a pair each have a contact area and the matrix polymer-rich area extends over part of the contact area only.

Yet another embodiment provides a laminate wherein the adjacent structural layers each have a contact width and length, and the matrix polymer-rich area extends over part of the contact width or length.

It may also be possible to provide an intermediate layer onto the reinforcing fibers of a structural layer. For instance, such reinforcing fibers may be coated with a shell or jacket of a polymer having the appropriate electrical resistance.

In order to influence the out-of-plane electrical volume resistance $R_1$ of the intermediate layer of a first pair, the material of said intermediate layer may be provided with conductive material. A useful embodiment provides a laminate wherein the intermediate layer of the first pair comprises conductive particles, such as metal particles, embedded in a thermoplastic polymer. Other additives may also be used, such as ferromagnetic particles.

The electrical volume resistance is also influenced by the electrical volume resistivity of the material from which the intermediate layers are made. The electrical volume resistivity of a material is measured by standard test methods such as described in ASTM D257. In short, a standard size specimen is placed between two electrodes. A voltage is then applied for a period of time (60 sec) and the resistance is measured. Volumetric resistivity is then calculated according to formula (1) given above. All values of the electrical (volume and surface) resistivity and resistance are measured at a temperature of 25° C. For small deviations, a correction is applied, as explained in ASTM D257.

According to an embodiment of the invention, a laminate is provided wherein the material of the intermediate layer of the first and/or second pair of adjacent structural layers has an electrical volume resistivity of between $10^{15}$ Ohm.cm and $20.10^{15}$ Ohm.cm.

The resistance offered by any material to an electric current is the composite effect of volume and surface resistances, which always act in parallel. Volume resistance is the resistance to leakage if the electric current passes through the body of the material, while surface resistance relates to the resistance to leakage along the surface of a material or an interface between two materials. The surface resistivity of an electrically insulating material is orders of magnitude smaller than its volumetric resistivity.

According to another aspect of the invention, a method of manufacturing a molded part of the invented composite laminate is provided. The method comprises the steps of:
  providing a plurality of structural layers, each comprising electrically conductive fibers embedded in a thermoplastic matrix;
  providing an intermediate layer having an out-of-plane electrical volume resistance $R_1$ in between two adjacent structural layers to form a first pair, in which eddy currents are substantially allowed to flow between the two structural layers of the first pair;
  providing an intermediate layer having an out-of-plane electrical volume resistance $R_2$ in between two adjacent structural layers to form a second pair, in which eddy currents are substantially prevented from flowing between the two structural layers of the second pair, wherein $R_1$ and $R_2$ are finite and $0<R_1<R_2$, wherein the intermediate layer in each pair differs from the two structural layers in each pair, preferably in that the intermediate layer in each pair does not comprise electrically conductive fibers;
  optionally providing two adjacent structural layers against each other to form an optional third pair;
  stacking the structural and intermediate layers to form a stack of one or more of the first, second and optional third pairs;
  forming the stack thus obtained by heating the stack and applying pressure to form a molded part of the composite laminate; and
  consolidating the molded part by cooling.

Exemplary embodiments of the method of manufacturing the molded part provides methods wherein the laminate has an electromagnetically weldable outside surface and the first pair is positioned in the laminate at the weldable outside of the laminate in the out-of-plane direction of the laminate; wherein the laminate has an electromagnetically weldable outside surface and one of the second or third pair is positioned in the laminate at an outside opposite the weldable outside or inside the laminate; wherein the electrically conductive fibers in at least one of the structural layers of the first, second and/or optional third pair are locally interrupted in at least one of the adjacent structural layers; wherein the electrically conductive fibers in two of the structural layers of the first, second and/or optional third pair are locally interrupted along a line in one structural layer of the pair, and along another line in the other adjacent layer of the pair, whereby both lines cross each-other; wherein the electrically conductive fibers in two of the structural layers of the first, second and/or optional third pair are locally interrupted along a line in one structural layer of the pair, and along another line in the other adjacent layer of the pair, whereby both lines coincide with each-other; wherein the electrically conductive fibers in the first and/or optional third pair are locally interrupted; wherein the conductive fibers in the structural layers are unidirectionally oriented, and wherein the plurality of structural layers are stacked such that at least the first pair comprises structural layers in which the unidirectional fiber direction differs from one structural layer to another in said first pair; wherein the structural layers have a thickness and a matrix polymer-rich area extends over part of the thickness at one or both sides of some of the layers, and wherein the intermediate layer of the first and/or second pair is formed by the polymer-rich area of at least one of the adjacent structural layers of the pair; wherein the intermediate layer of the second pair is formed by the matrix polymer-rich area of both adjacent structural layers of the pair; wherein the adjacent structural layers each have a contact area and the matrix polymer-rich area extends over part of the contact area; wherein the adjacent structural layers each have a contact width and length, and the matrix polymer-rich area extends over part of the contact width or length; wherein the intermediate layer of the first pair comprises conductive particles embedded in a thermoplastic polymer in order to tune the out-of-plane electrical volume resistance $R_1$, substantially allowing eddy currents to flow between the two structural layers of the first pair; wherein the matrix thermoplastic polymer of the structural layers and/or the intermediate layer of the first and/or second pair comprises a semi-crystalline polyaryletherketone thermoplastic polymer; and wherein the material of the intermediate layer of the first and/or second pair of adjacent structural layers has an electrical volume resistivity of between $10^{15}$ Ohm.cm and $20.10^{15}$ Ohm.cm, as measured by ASTM D257.

According to yet another aspect of the invention, a method for electromagnetic welding of molded parts of the invented laminate is provided. The method comprises the steps of:
  bringing the weldable outside surfaces of the molded parts in contact with each other to define a contact surface;
  providing an inductor that generates an electromagnetic field under alternating voltage and heats the electrically conductive fibers in the molded parts such that the matrix polymer of the structural layers of the second pair of each molded part is maintained above its melting temperature;
  the matrix polymer of the structural layers of the first and the optional third pair of each molded part is maintained below its melting temperature; and
  optionally pressing the molded parts together.

The method makes it possible to realize a good-quality welded connection between the molded parts in a rapid and efficient manner, wherein the product obtained has a particularly good mechanical load-bearing capacity. Heat is efficiently generated in the first pairs of structural layers to bring the thermoplastic matrix above its softening or melting temperature, while heating up of the second pairs of structural layers is hindered in order to keep the temperature of the thermoplastic matrix in said second pairs below its softening or melting temperature. Because the inductor does not necessarily come into contact with the molded parts, the chance of mechanical damage is minimized, this being particularly important for high-grade applications such as in aviation and aerospace.

According to an embodiment, a method is provided wherein the inductor is moved along a path relative to the contact surface of the molded parts such that the electrically conductive fibers are heated in a predetermined part of the contact surface. This further enhances efficiency. The inductor may be moved over the contact surface by means of a robot arm for instance, or by a linear guide in order to realize the connection.

The type of inductor may be chosen according to the circumstances. It may for instance be coil-shaped. The method may also use an inductor that comprises a linear induction segment. A linear induction segment generates an electromagnetic field that is substantially cylindrical in at least a direction of welding. By positioning the inductor such that the induction segment runs substantially parallel to the wall of a mold, the contact surface between the molded parts may be heated in a highly selective manner, whereby a precise welded connection may be obtained.

Depending on the materials used, a suitable power and frequency of the electromagnetic field may be determined. The frequency determines inter alia the penetrative power of the electromagnetic field; the electric power of the inductor determines the strength of the fluctuating electromagnetic field and thereby the degree of heat generated in the electrically conductive fibers.

For application in the method according to the invention the inductor is connected to an alternating current generator, wherein the alternating current generator is electrically connected to the electrical connecting means of the inductor. Usable frequencies lie generally between 0.1-10 MHz. A frequency between 0.1 and 0.5 MHz is preferably used, and more preferably a frequency between 0.15 and 0.4 MHz. At such a preferred frequency an optimal balance is achieved between penetrative power of the electromagnetic field and rate of heating.

The embodiments of the invention described in this patent application can be combined in any possible combination of these embodiments, and each embodiment can individually form the subject-matter of a divisional patent application.

BRIEF DESCRIPTION OF THE FIGURES

The invention will now be elucidated with reference to the following figures, without however being limited thereto. In the figures.

DETAILED DESCRIPTION OF EXEMPLARY EMBODIMENTS

Figure 1:
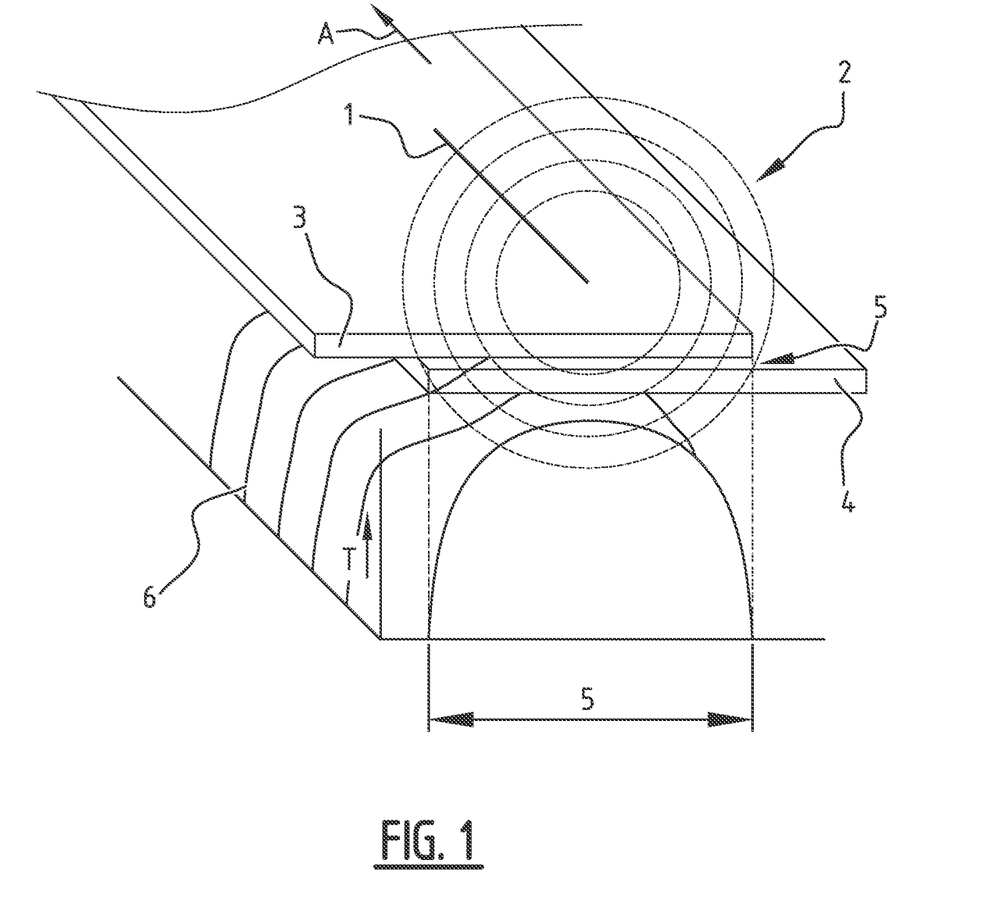
FIG. 1 schematically shows a method for joining two molded parts by electromagnetic welding according to an embodiment of the invention.

FIG. 1 shows a linear inductor 1 which causes a circular electromagnetic field 2 by applying an alternating current of a frequency suitable for electromagnetic welding at a suitable power. A first molded part or laminate 3 and a second molded part or laminate 4 are brought into mutual contact along contact surfaces in this electromagnetic field 2. The molded parts are manufactured from a thermoplastic resin reinforced with carbon fibres. Heat develops locally in the carbon fibres under the influence of the electromagnetic field 2, whereby the thermoplastic polymer is heated to above its melting temperature, at least at the contact surface 5. By pressing with pressing means (not shown) it is possible to couple the thus thermally activated thermoplastic molded parts (3, 4) at the contact surface 5, wherein the coupling at contact surface 5 becomes permanent after cooling of the molded parts (3, 4) to a temperature below the softening or melting temperature of the thermoplastic polymer. The figure further shows the temperature diagram at the contact surface 5 during heating, in which the relative temperature T is plotted against the position on contact surface 5. A third direction 6 defines the direction in which the inductor coil 1 is moved during welding. The temperature diagram shows that the electromagnetic field 2 of constant strength may cause an irregular heating in the contact surface 5, wherein a more or less parabolic variation of the temperature is observed in the contact surface 5. The temperature diagram also shows a variation in the direction 6, which corresponds to the movement direction of the inductor coil 1, i.e. the direction of welding A. The variation in heating may further result in portions of the molded parts (3, 4) that are thermally degraded by local overheating and/or local incomplete mutual adhesion of the molded parts (3, 4). This is generally undesirable and a laminate and method according to the invention provides a solution to this and other problems.

Figure 2:
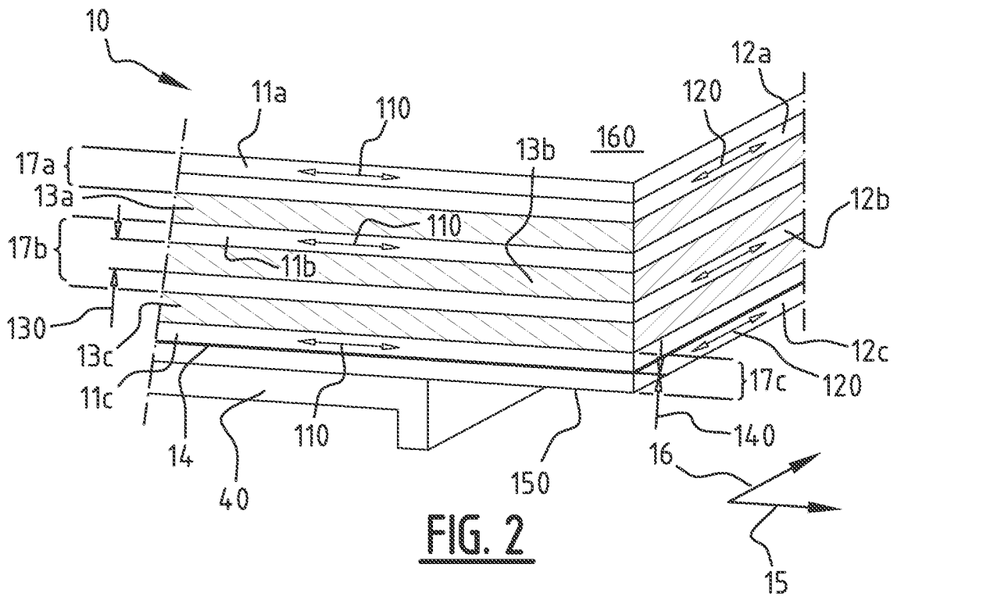
FIG. 2 schematically shows a perspective view of a laminate according to an embodiment of the invention.

With reference to FIG. 2, a schematic perspective view of a laminate 10 according to an embodiment of the invention is shown. The fiber-reinforced composite laminate 10 may be used advantageously in the electromagnetic welding of molded parts of said laminates, as shown in FIG. 1. The laminate 10 comprises 6 structural layers of which 3 structural layers (11a, 11b, 11c) have electrically conductive fibers embedded in a thermoplastic PEEK matrix such that the fibers extend unidirectionally (as shown by the arrows 110) parallel to a longitudinal direction 15 of the laminate 10. In the laminate 10, 3 other structural layers (12a, 12b, 12c) have electrically conductive fibers embedded in a thermoplastic matrix such that the fibers extend unidirectionally (as shown by the arrows 120) in a transverse direction 16 of the laminate 10. The fibers of the layers 11 (11a, 11b, 11c) and 12 (12a, 12b, 12c) therefore make an angle of 90 degrees relative to each other. Eddy currents are induced in the electrically conductive fibers by an electrical conductor 1, such as the one shown in FIG. 1 that generates an electromagnetic field 2.

The layers (11, 12) are mutually bonded, either directly or through intermediate layers (13, 14). The intermediate layers (13, 14) and the structural layers (11, 12) are stacked in such a way that the following stacking sequence is obtained.

A first pair 17c has an intermediate layer 14 positioned in between the two structural layers (11c, 12c) of the pair 17c. The intermediate layer 14 is made from a PEEK polymer with a given electrical volumetric resistivity and has an average thickness 140 that results in an out-of-plane electrical volume resistance $R_1$, which substantially allows eddy currents to flow between the two structural layers (11c, 12c) of the first pair 17c.

The laminate 10 also comprises second pairs 17b, each formed by one intermediate layer (13a, 13b, 13c) sandwiched between two adjacently positioned structural layers. For instance, the intermediate layer 13a is positioned between the structural layers 12a and 11b, the intermediate layer 13b is positioned between the structural layers 11b and 12b, and the intermediate layer 13c is positioned between the structural layers 12b and 11c. Please note that in this definition, a structural layer may be part of a different pair of layers. Indeed, the structural layer 11b for instance is part of two second pairs 17b. In the embodiment shown, the intermediate layers (13a, 13b, 13c) are also made from a PEEK polymer with a given electrical volumetric resistivity and all have an average thickness 130 that results in an out-of-plane electrical volume resistance $R_2$, which substantially prevents eddy currents from flowing between the structural layers (12a, 11b, 12b, 11c) that contact the intermediate layers (13a, 13b, 13c) of the second pairs 17b. The resistances $R_1$ and $R_2$ are finite and $0 < R_1 < R_2$. In the embodiment shown, $0,4\ R_2 < R_1 < 0,6\ R_2$, which is achieved by selecting the average thickness 140 to range between 0,4 and 0,6 of the average thickness 130.

The laminate may also comprise a third pair 17a of structural layers, as shown. The third pair 17a is located at a top surface of the laminate 10 and does not have an intermediate layer in between the two structural layers (11a, 12a) of the pair 17a. The layers (11a 12a) in other words are bonded directly to each other.

The laminate 10 as shown has an electromagnetically weldable outside surface which corresponds to a bottom surface 150. A shown, the first pair 17c is located in the laminate 10 in the out-of-plane direction 18 of the laminate 10 close to the weldable outside surface 150 of the laminate 10. The second pairs 17b are located inside the laminate 10, further remote from the bottom surface 150. The third pair 17a is located at the top surface 160 of the laminate 10.

The molded laminate 10 may be electromagnetically welded or bonded to another molded part 40. Although not shown in detail, this molded part 40 may also comprise a laminate as described above. A shown in FIG. 1, in which the parts (3, 4) are replaced by the laminate 10 and the molded part 40 respectively, heat develops locally in the carbon fibres under the influence of the electromagnetic field 2, whereby the thermoplastic PEEK polymer is heated to above its melting temperature, at least at the bottom surface 150. By pressing with pressing means (not shown) it is possible to couple the thus thermally activated thermoplastic molded parts (10, 40) at the bottom surface 150, wherein the coupling at contact surface 5 becomes permanent after cooling of the molded parts (10, 40) to a temperature below the softening or melting temperature of the thermoplastic PEEK polymer. Due to the presence of the second pairs 17b in the laminate 10, heating of these pairs 17b to above the softening or melting temperature of the thermoplastic PEEK polymer is substantially prevented. This prevents overheating of these second pairs 17b. On the other hand, due to the presence of the first pair 17c in the laminate 10, heating of this pair 17c to above the softening or melting temperature of the thermoplastic PEEK polymer is catalysed, and the electromagnetic field strength is more efficiently used than known. The third pair 17a is also heated up but more moderately than the first pair 17c. To prevent overheating in the first pair 17c, a heat sink (not shown) may be applied to the top surface 160 of the laminate 10.

Please note that another intermediate layer having an out-of-plane electrical volumetric resistance $R_1$ may be positioned between the bottom surface 150 and a top surface of the molded part 40, if desired.

Figure 3:
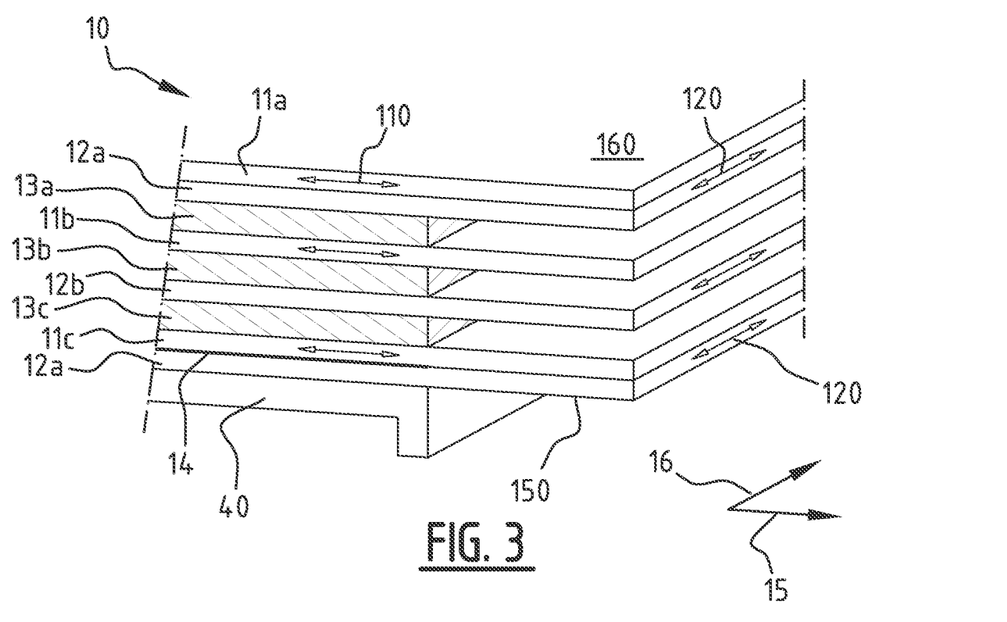
FIG. 3 schematically shows a perspective view of a laminate according to another embodiment of the invention.

FIG. 3 schematically shows a perspective view of a laminate according to another embodiment of the invention, in which the intermediate layers (13, 14) extend over part of a length of the laminate 10 in the longitudinal direction 15. Please note that the reference numbers used denote the same features as in FIG. 2. Please also note that the laminate is shown in unconsolidated state with exaggerated thickness of the layers. When consolidated, the layers 12a, 11b, 12b, and 11c will de pressed against each other along the transverse side 170 of the laminate. In the embodiment shown, the intermediate layers (13, 14) extend as far as the molded part 40 to which the laminate 10 is welded, at least in the longitudinal direction 15.

Figure 4:
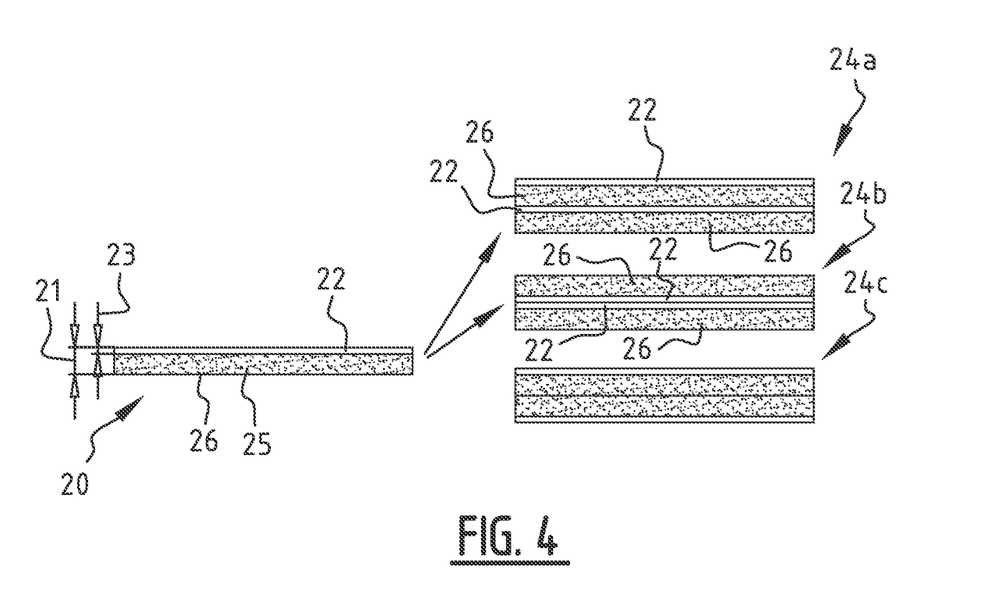
FIG. 4 schematically shows pairs of structural layers that may be used in a laminate according to yet another embodiment of the invention.

As shown in FIG. 4, an embodiment of the laminate may be built up of fiber-reinforced prepregs 20 as structural layers (11, 12). Each prepreg 20 has a thickness 21 and a matrix polymer-rich area 22 that extends over part 23 of the thickness at one side of the prepreg 20, namely at a top side of the prepreg 20 as shown in the left-hand side figure of FIG. 4. A fiber-reinforced area 25 comprises the reinforcing fibers of the prepreg 20 embedded in the matrix polymer. The polymer-rich area 22 is essentially void of reinforcing fibers. The fiber-reinforced area 25 extends to a bottom side of the prepreg 20 and this bottom side is referred to as a polymer-starved area 26. These prepregs 20 are used to build the laminate 10 by stacking a plurality of such prepregs 20 on top of each other according to a certain stacking sequence. Examples of a stack of two prepregs 20 are shown in the right-hand side figure of FIG. 4. A first stack 24a of two prepregs 20 comprises prepregs 20 in which the polymer-rich area 22 of one prepreg 20 contacts a polymer-starved area 26 of the second prepreg 20 to form an intermediate layer of thickness 23. A second stack 24b of two prepregs 20 comprises prepregs 20 in which the polymer-rich area 22 of one prepreg 20 contacts a polymer-rich area 22 of the second prepreg 20 to form an intermediate layer of two times the thickness 23. A third stack 24c of two prepregs 20 comprises prepregs 20 in which the polymer-starved area 26 of one prepreg 20 contacts a polymer-starved area 26 of the second prepreg 20. This creates a third pair 17a of structural layers (11a, 12a) in which an intermediate layer is lacking. Depending on the electrical volumetric resistances achieved (or alternatively the thicknesses achieved), the stack 24a may form a first pair having an intermediate layer 22 positioned in between the two structural prepregs 20, wherein the intermediate layer has an out-of-plane electrical volume resistance $R_1$, which substantially allows eddy currents to flow between the two structural layers of the first pair which substantially allows eddy currents to flow between the two structural layers of the first pair. Depending on the electrical volumetric resistances achieved (or alternatively the thicknesses achieved), the stack 24b may form a second pair having an intermediate layer, formed by two polymer-rich areas 22, positioned in between the two structural prepregs 20, wherein the intermediate layer has an out-of-plane electrical volume resistance $R_2$, which substantially prevents eddy currents from flowing between the two structural layers of the second pair.

Figure 5:
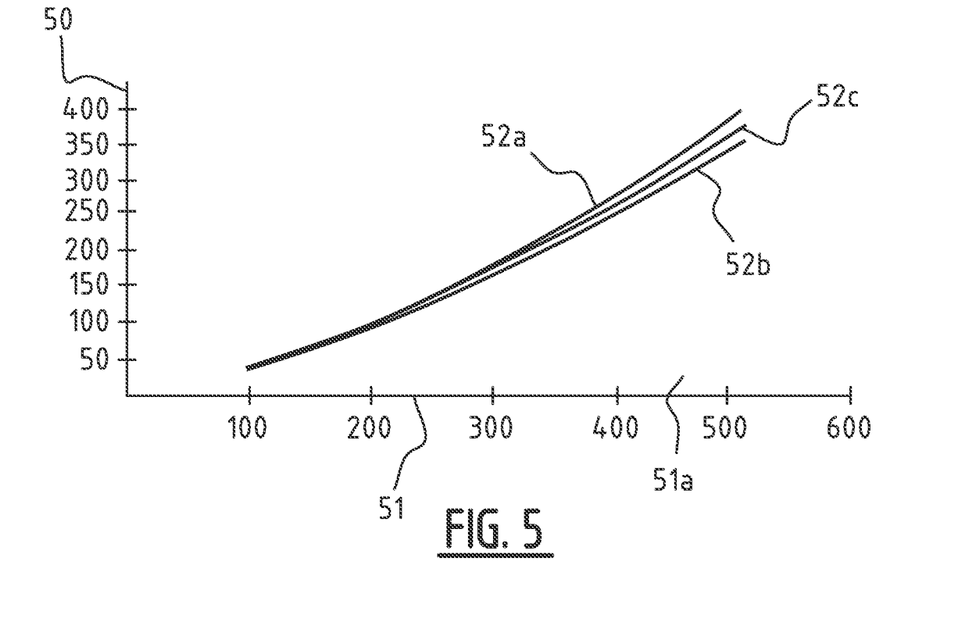
FIG. 5 schematically shows heating curves for the pairs shown in FIG. 4.

Referring to FIG. 5 heating curves for the pairs shown in FIG. 4 are schematically shown. In the diagram, the temperature 50 (° C.) reached in a pair is shown in function of the current 51 (in A) that goes through the inductor. The upper curve 52a represents the results obtained on the stack 24a, whereas the lower curve 52b represents the results obtained on the stack 24b. The results obtained on the stack 24c are in between these two extremes 9 (curve 52c). It is clear that less current is needed to heat up stack 24a than stack 24b. Alternatively, for a same current value 51a (or electromagnetic filed strength), the stack 24a will heat up above the softening or melting temperature of the matrix polymer, whereas the stack 24b may remain below its softening or melting temperature, the difference of temperature reached being about 30° C.

Figure 6:
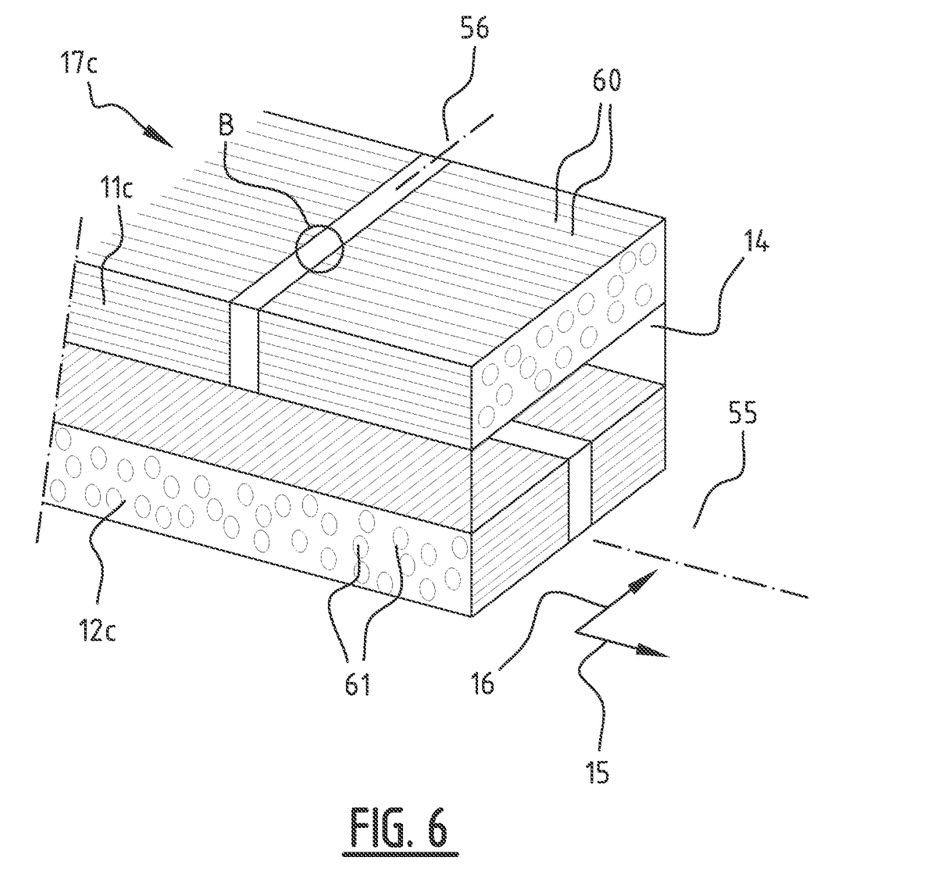
FIG. 6 schematically shows part of a laminate according to yet another embodiment of the invention.

Yet another embodiment of the invented laminate 10 is shown in FIG. 6. Please note that a pair 17c of two structural layers (11c, 12c) is shown only (reference numbers are in accordance with FIG. 2), wherein the pair 17c further comprises an intermediate layer 14, shown as a transparent layer. In this embodiment, the electrically conductive fibers (60, 61) in two of the structural layers (11c, 12c) of the first pair 17c are locally interrupted along a line 55, parallel to the longitudinal direction 15 of the laminate, in a lower structural layer 12c of the pair, in which the fibers 61 extend in the transverse direction 16 of the laminate, and along another line 56, parallel to the transverse direction 16 of the laminate, in the upper structural layer 11c of the pair, in which the fibers 60 extend in the longitudinal direction 15 of the laminate. As shown, both lines (55, 56) cross each-other at an area B, and it has turned out that heating is strongly enhanced in and around this area B, due to the interruption of the electrically conducting fibers. To obtain the effect, it may also be possible to interrupt the fibers over a part of a thickness of the two structural layers (11c, 12c).

Figure 7A:
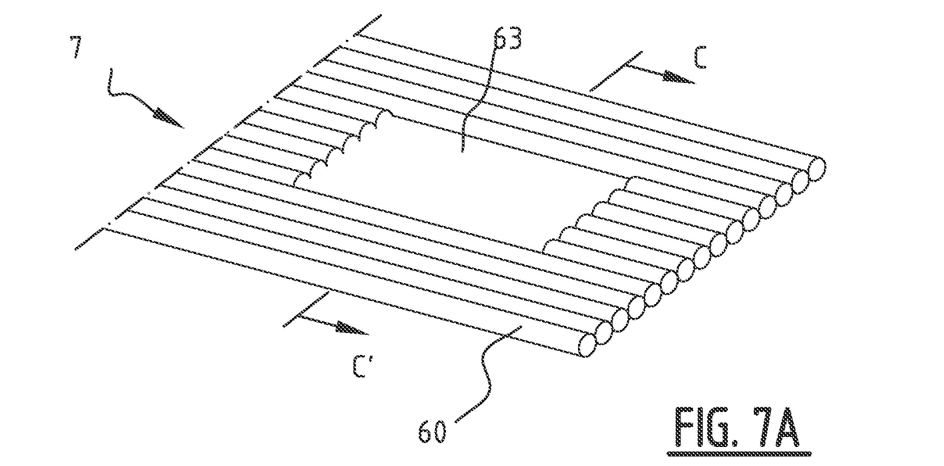
FIG. 7A schematically shows a perspective view of a monolayer of conductive fibers as part of a laminate according to yet another embodiment of the invention.
Figure 7B:
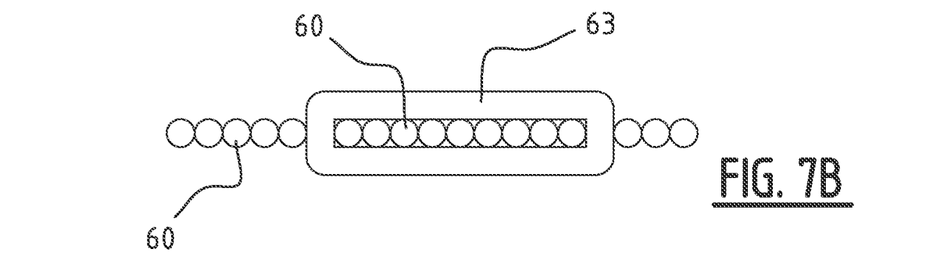
FIG. 7B schematically shows a cross-section of the monolayer shown in FIG. 7A.

Similar principles as elucidated above may be applied on a smaller level, i.e on the level of a monolayer 7 of fibers (60, 61). Referring to FIG. 7A and the cross-sectional view according to a line C-C' of FIG. 7B, a number of fibers 60 is seen to be coated or surrounded by a polymer layer or sheet 63. The polymer layer or sheet 63 may have an out-of-plane electrical volume resistance $R_1$, which substantially allows eddy currents to flow between two structural monolayers 7 stacked on top of each other. Alternatively, the polymer layer or sheet 63 may have an out-of-plane electrical volume resistance $R_2$, which substantially prevents eddy currents from flowing between two structural monolayers 7 stacked on top of each other. Although FIG. 7B shows a plurality of fibers 60 that are coated or surrounded by the polymer layer or sheet 63, such coating or sheeting 63 may also be applied around one fiber (having multiple filaments) or fiber bundle.

Figure 8:
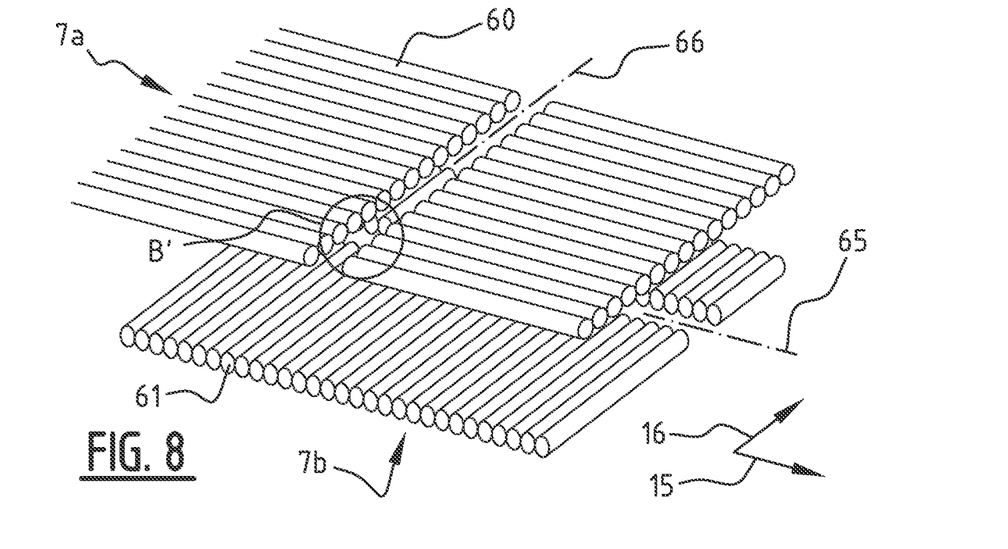
FIG. 8 schematically shows a perspective view of two monolayers of conductive fibers as part of a laminate according to yet another embodiment of the invention.

Referring to the embodiment of FIG. 8, the electrically conductive fibers (60, 61) in two adjacent monolayers 7 (7a, 7b) are locally interrupted along a line 65, parallel to the longitudinal direction 15 of the laminate, in a lower monolayer 7b of the pair, in which the fibers 61 extend in the transverse direction 16 of the laminate, and along another line 66, parallel to the transverse direction 16 of the laminate, in the upper monolayer 7a of the pair, in which the fibers 60 extend in the longitudinal direction 15 of the laminate. As shown, both lines (65, 66) cross each-other at an area B', and it has turned out that heating is strongly enhanced in and around this area B', due to the interruption of the electrically conducting fibers (60, 61).

Figure 9:
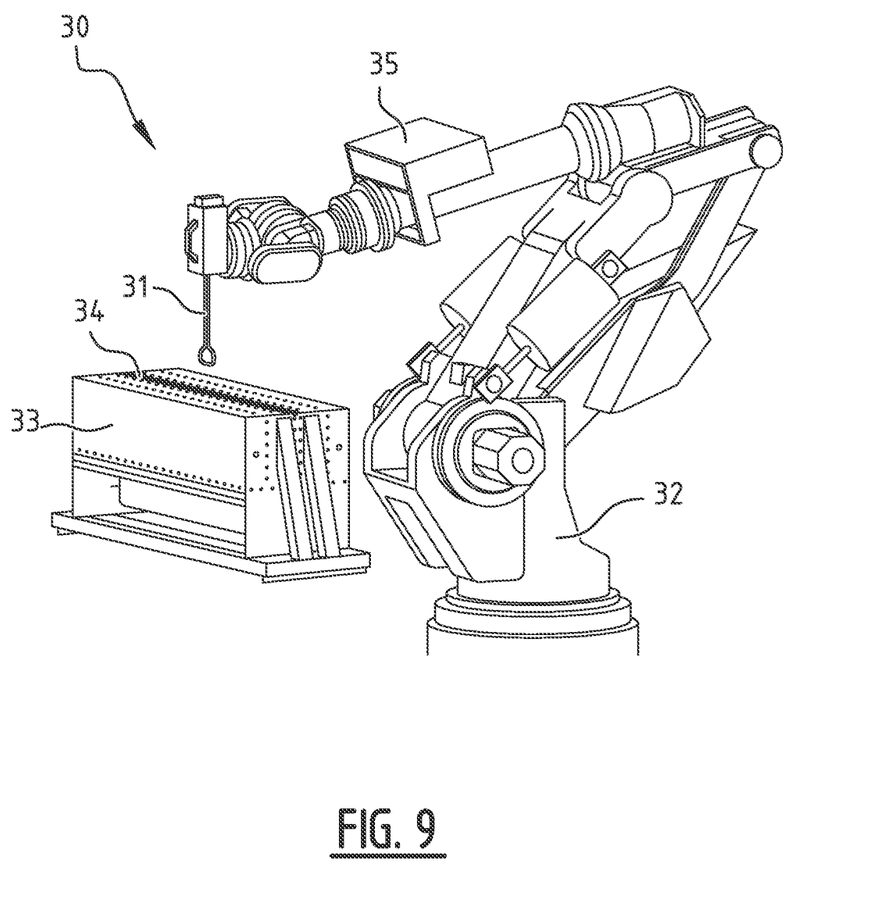
FIG. 9 finally shows a welding device that may be used in a method in accordance with an embodiment of the invention.

FIG. 9 finally shows a welding device 30 provided with a joining inductor 31. The inductor 31 may be guided along a line of welding which may be a pre-programmed path by means of an industrial six-axis robot 32 in order to achieve a desired weld. In this case molded parts in accordance with embodiments of the invention may be fixed for welding and pressed together in a mold 33, manufactured for this purpose. Mold 33 may be provided with a recess 34 through which the inductor 15 may be moved close to the molded parts for welding. The inductor 15 may be connected to an alternating current generator 35 arranged on robot 32 for the purpose of generating the electromagnetic field. The strength of the electromagnetic field may be varied along the line of welding to at least partly compensate for any temperature variations that may occur in the contact plane of the molded parts along the line of welding.

The invention claimed is:

1. A fiber-reinforced composite laminate for use in electromagnetic welding of molded parts of said laminates, the laminate comprising a plurality of structural layers, each formed of electrically conductive fibers embedded in a thermoplastic matrix, wherein eddy currents may be induced in the electrically conductive fibers by an electrical conductor that generates an electromagnetic field;
   wherein the plurality of structural layers comprises a first, a second and, optionally, a third pair of two adjacently positioned structural layers, wherein:
   the first pair has an intermediate layer positioned in between the two structural layers of the pair, wherein the intermediate layer has an out-of-plane electrical volume resistance R1, which substantially allows eddy currents to flow between the two structural layers of the first pair;
   the second pair has an intermediate layer positioned in between the two structural layers of the pair, wherein the intermediate layer has an out-of-plane electrical volume resistance R2, which substantially prevents eddy currents from flowing between the two structural layers of the second pair; and
   the optional third pair does not have an intermediate layer in between the two structural layers of the pair;
   wherein:
   $R_1$ and $R_2$ are finite and $0 < R_1 < R_2$;
   the intermediate layer in each first and second pair differs from the two structural layers in each first and second pair in that the intermediate layer in each first and second pair does not comprise the electrically conductive fibers; and
   the condition $R_1 < R_2$ is achieved by having $p_1 \cdot t_1 < p_2 \cdot t_2$ wherein $p_1$ is the electrical volumetric resistivity of the material of the intermediate layer in the first pair, $t_1$ is the average thickness of the intermediate layer in the first pair, $p_2$ is the electrical volumetric resistivity of the material of the intermediate layer in the second pair, and $t_2$ is the average thickness of the intermediate layer in the second pair.

2. The laminate according to claim 1, wherein the laminate has an electromagnetically weldable outside surface and the first pair is located in the laminate at the weldable outside of the laminate in the out-of-plane direction of the laminate.

3. The laminate according to claim 1, wherein the laminate has an electromagnetically weldable outside surface and one of the second or optional third pair is located in the laminate at an outside opposite the weldable outside or inside the laminate.

4. The laminate according to claim 1, wherein at least the intermediate layer in the second pair comprises non-conductive fibers, such as in the form of a thickness calibration gauze or mesh.

5. The laminate according to claim 1, wherein the electrically conductive fibers in at least one of the structural layers of the first, second and/or optional third pair are locally interrupted in at least one of the adjacent structural layers.

6. The laminate according to claim 5, wherein the electrically conductive fibers in two of the structural layers of the first, second and/or optional third pair are locally interrupted along a line in one structural layer of the pair, and along another line in the other adjacent layer of the pair, whereby both lines cross each-other.

7. The laminate according to claim 5, wherein the electrically conductive fibers in the first and/or optional third pair are locally interrupted.

8. The laminate according to claim 1, wherein the conductive fibers in the structural layers are unidirectionally oriented.

9. The laminate according to claim 1, wherein the intermediate layer of the first pair comprises a thermoplastic polymer and has an average thickness of between 0.05 and 0.15 mm and wherein the intermediate layer of the second pair comprises a thermoplastic polymer and has an average thickness of larger than 0.20 mm.

10. The laminate according to claim 1, wherein the structural layers have a thickness, and a matrix polymer-rich area extends over part of the thickness at one or both sides of some of the layers.

11. The laminate according to claim 10, wherein the intermediate layer of the first and/or second pair is formed by the polymer-rich area of at least one of the adjacent structural layers of the pair.

12. The laminate according to claim 1, wherein the intermediate layer of the first pair comprises conductive particles embedded in a thermoplastic polymer in order to tune the out-of-plane electrical volume resistance $R_1$, substantially allowing eddy currents to flow between the two structural layers of the first pair.

13. The laminate according to claim 1, wherein the material of the intermediate layer of the first and/or second pair of adjacent structural layers has an electrical volume resistivity of between $10^{15}$ Ohm.cm and $20.10^{15}$ Ohm.cm, as measured by ASTM D257.

14. A method for electromagnetic welding of molded parts of the laminate of claim 1, comprising:
bringing the weldable outside surfaces of the molded parts in contact with each other to define a contact surface;
providing an inductor that generates an electromagnetic field under alternating voltage and heats the electrically conductive fibers in the molded parts such that the matrix polymer of the structural layers of the second pair of each molded part is maintained above its melting temperature;
the matrix polymer of the structural layers of the first and the optional third pair of each molded part is maintained below its melting temperature; and
optionally pressing the molded parts together.

15. The method according to claim 14, wherein the inductor is moved along a path relative to the contact surface of the molded parts such that the electrically conductive fibers are heated in a predetermined part of the contact surface.

16. The method according to claim 14, wherein the inductor comprises a linear induction segment that generates an electromagnetic field that is substantially cylindrical in at least a direction of welding.

\* \* \* \* \*